United States Patent [19]
Forsberg

[11] Patent Number: 5,444,563
[45] Date of Patent: Aug. 22, 1995

[54] METHOD AND ARRANGEMENT TO CONVERT AN OPTICAL DATA SIGNAL FROM A MULTI MODE FIBRE TO A CORRESPONDING SIGNAL INTO A SIGNAL MODE FIBRE

[75] Inventor: Gunnar S. Forsberg, Stockholm, Sweden

[73] Assignee: Fogim HB, Stockholm, Sweden

[21] Appl. No.: 137,162

[22] PCT Filed: Apr. 29, 1992

[86] PCT No.: PCT/SE92/00285
   § 371 Date: Oct. 28, 1993
   § 102(e) Date: Oct. 28, 1993

[87] PCT Pub. No.: WO92/20172
   PCT Pub. Date: Nov. 12, 1992

[30] Foreign Application Priority Data
   May 8, 1991 [SE] Sweden ................................ 9101397

[51] Int. Cl.⁶ ............................................ H04B 10/02
[52] U.S. Cl. ............................... 359/179; 359/174; 359/177; 375/211; 375/214; 455/9
[58] Field of Search ............... 359/174, 176, 177, 179, 359/161, 178; 375/3, 3.1, 4, 7; 455/7, 9, 10; 370/97, 75; 328/163

[56] References Cited
U.S. PATENT DOCUMENTS

| | | | |
|---|---|---|---|
| 4,257,125 | 3/1981 | Theall, Jr. | 455/608 |
| 4,761,797 | 8/1988 | Bickers | 375/4 |
| 4,864,649 | 9/1989 | Tajima et al. | 455/608 |
| 5,162,936 | 11/1992 | Taga et al. | 359/177 |

*Primary Examiner*—Thomas P. Noland
*Assistant Examiner*—Richard A. Moller
*Attorney, Agent, or Firm*—Young & Thompson

[57] ABSTRACT

The present invention discloses a method and a device for conversion of an optical data signal from a multimode fibre (1), which except for normal data signals may contain interruptions and an overmodulated low frequency signal, to a corresponding signal which is transmitted further into a single mode fibre (8) by a laser (7). An electric signal from an optical receiver (2) partly directly and partly through a low pass filter (4) is coupled to a comparator (5) the output of which modulates the laser (7). Upon detection of an optical interruption the low pass filter (4) is influenced such that its output signal is stored in a memory device, and the laser is influenced by diversion of the laser current, simultaneously as an analogue value in the control loop of the laser is stored. When the interruption ends both the laser transmitter (7) and the low pass filter (4) continue to operate as before on the basis of their stored analogue values.

7 Claims, 3 Drawing Sheets

METHOD AND ARRANGEMENT TO CONVERT AN OPTICAL DATA SIGNAL FROM A MULTI MODE FIBRE TO A CORRESPONDING SIGNAL INTO A SIGNAL MODE FIBRE

FIELD OF THE INVENTION

The present invention relates to a method and a device to convert an optical data signal from a multimode fibre to a corresponding signal which is transmitted further into a single mode fibre by means of a laser. In particular, the present invention relates to converting an incoming optical signal into electric signals which in turn are converted into an optical output signal. The incoming signal is generated by a light emitting diode meaning that it is optically incoherent. The outgoing signal is assumed to originate from a laser. The incoming optical data signal comprises "ones" (high optical level) and "zeros" (a lower optical level) and may also contain interruptions (a further lower optical level) and an overmodulated low frequency signal.

DESCRIPTION OF PRIOR ART

For many years it has been known that an incoming optical data signal may be recreated to a similar outgoing signal by having such signal go through a fibre optical regenerator which converts the incoming optical signal into electric signals, which in turn are converted into an optical output signal. In those instances where the type of incoming optical signal is known, i.e. such parameters as bit rate, encoding, etc. are known, it is possible to design an arrangement which recreates the incoming optical signal into a corresponding optical output signal. The drawback of such an arrangement is that if the optical input signal is different from the signal for which the arrangement was designed, it is likely that the conversion will not work. Further, with the exception of a data signal, there is no such arrangement known which manages to transfer an overmodulated low frequency signal and optical interruptions.

It should be noted that there are known fibre optical amplifiers which, without electric intermediary steps, may recreate an arbitrary optical input signal. Such fibre optical amplifiers require that the incoming optical signal be coherent. This is not a prerequisite of the present invention.

SUMMARY OF THE INVENTION

The technical problem of the present case is to be able to transfer a normal digital optical data signal, which additionally may contain optical interruptions, as well as an overmodulated low frequency signal, without detailed knowledge of the type of optical signal.

FIG. 1 demonstrates an example of such an optical signal. Note that the vertical scale is graded in dBm (dB related to 1 mW) to better manifest what a so called optical interruption implies. Due to practical reasons, FIG. 1 is not produced fully according to scale. If, for example, the data rate is 10 Mbit/s the overmodulated low frequency signal may only be of the order 5 Khz, i.e., several orders of magnitude less that the data rate, which is not obvious from FIG. 1. The optical interruption may typically vary from a few hundred μs to several seconds.

In optical systems making use of interruptions, e.g., fibre optical network versions of a Token ring, Ethernet or Token bus, it is required that the optical power level, during the interruption, be very low, e.g., less than −40 dBm. Conventional laser transmitters are not able to transfer such interruptions since a laser transmitter is normally biased to its so called laser threshold, which may typically be at −25 dBm; i.e. about 30 times (15 dB) higher in power than an interruption. The present invention contains a laser transmitter which overcomes these concerns.

The most essential advantage of the present invention is that it is possible to transfer in a simple manner an unknown type of normal digital optical data signal which additionally may contain optical interruptions and an overmodulated low frequency signal.

DESCRIPTION OF THE PREFERRED EMBODIMENTS

Figure 2:
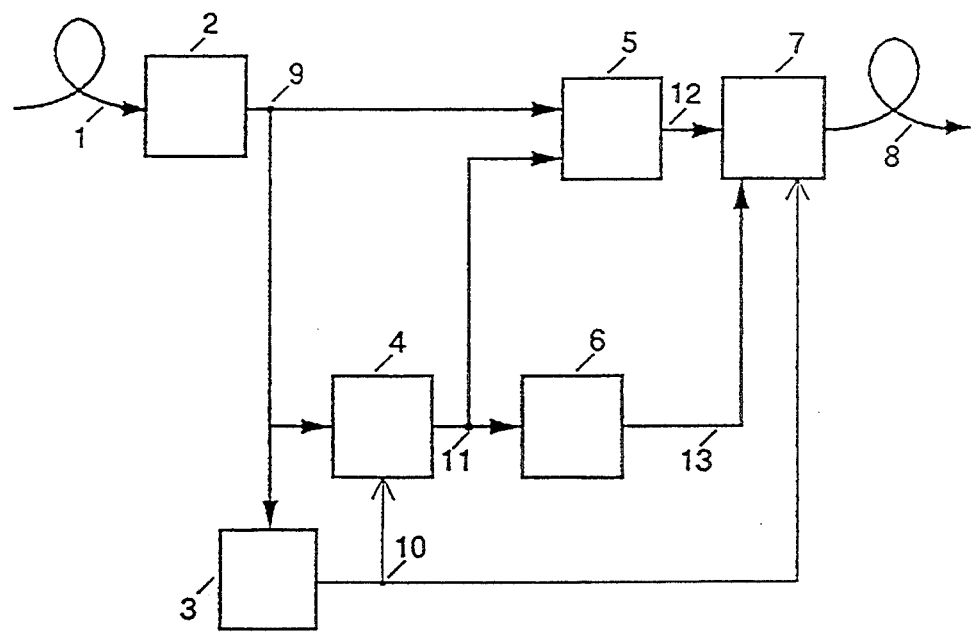
FIG. 2 is a block diagram which demonstrates an arrangement of the present invention.

FIG. 2 demonstrates an arrangement of the present invention in the form of a block diagram. An optical input signal arrives through an optical fibre 1. Such optical signal is transferred to a DC-coupled receiver 2 which transforms the optical signal into a proportional electric signal which is available at node 9. The DC-coupling of the receiver signifies that the signal average of the electric signal is directly proportional to the optical average power.

Figure 1:
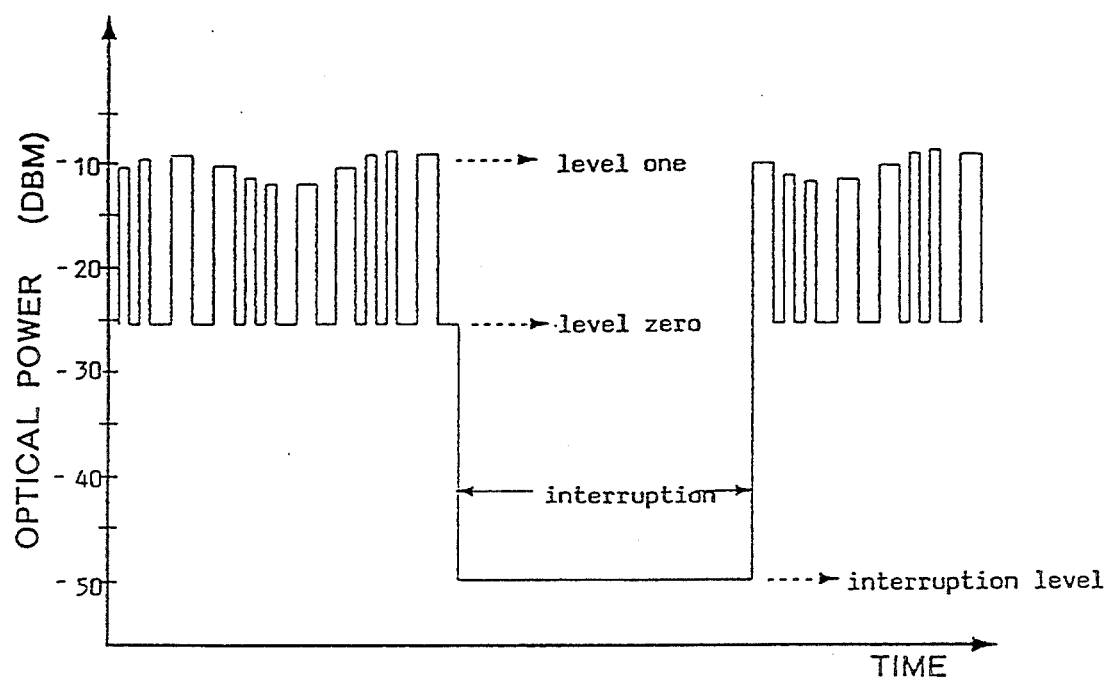
FIG. 1 is a graph which demonstrates an example of an optical input signal and an optical output signal of the arrangement according to the present invention.

The output signal from the receiver 2 is connected to an interruption detector 3 having a given preset interruption detection delay. Before proceeding with a discussion of detector 3, it will be helpful to further discuss the signal shown in FIG. 1. In particular, it should be noted that if the overmodulated low frequency signal is disregarded, the optical input signal is designated in FIG. 1 as having three levels, namely, "level one", "level zero" and "interruption level". Level "one" corresponds to the highest optical level and level "zero" is typically 10–20 dB (10–100 times) below level "one". The interruption level is typically 30–40 dB below level "one".

It should also be noted that in technical specifications of optical data signals it is only the proportion between "level one" and "level zero" which is specified as being greater than a particular quantity in dB. The same is true for the proportion between "level one" and the "interruption level". Therefore, there is no interest in transferring the optical levels exactly as those happen to exist in the input signal. It is sufficient if the difference in levels is sufficiently large. There is also no interest in detecting the interruption level by measurement of the level since there is in reality no guarantee that "level zero" is higher than the "interruption level", even if it is in most cases The only way to know for certain that a real interruption is present is to measure the time when the signal is not at "level one" since it is at such time that all data signals have a longest possible length of "level zero". The interruption detector 3 therefore serves to primarily detect only "level one" or "not level one" conditions.

Thus the interruption detection delay provides that normal stops (depending on a number of "zeros" in the data signal) will always be shorter than the preset interruption detection delay. This delay is necessary in order that the laser not be fully cut off at every optical "zero". The interruption detector 3 has an output signal which may stay in either of two logical states which are referred to herein as "freeze" and "non-freeze". When the interruption detector 3 detects an interruption (after the delay) the output changes to the "freeze" state. As soon as the interruption is over it changes, after an arbitrary short delay, to the "non-freeze" state. One embodiment of the interruption detector 3 includes an adjustable interruption detection delay which is viewable from the outside of the interruption detector. The benefit of this arrangement is that the user of the device according to the invention may interface the device to different types of optical input signals.

Figure 3:
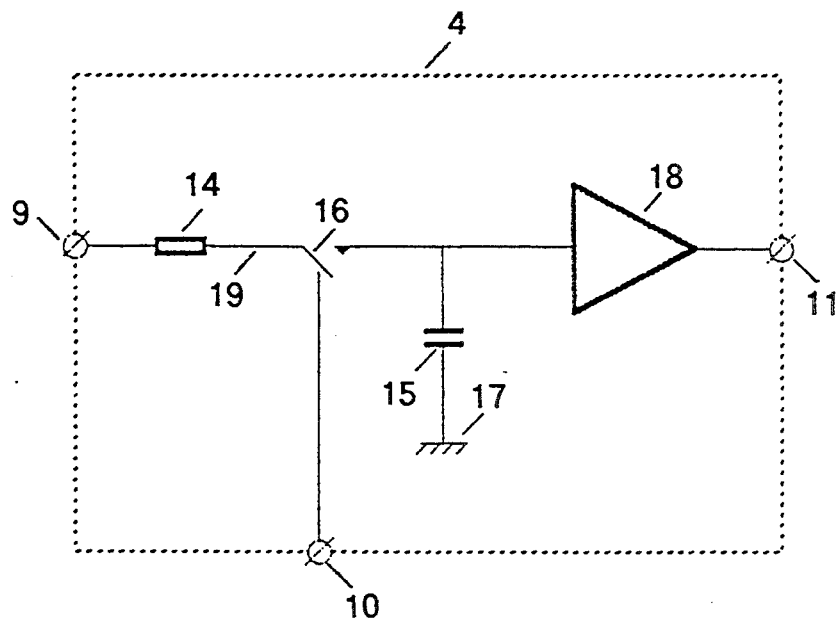
FIG. 3 is an embodiment of a low pass filter 4 of the arrangement of FIG. 2.

The low pass filter 4 filters the low frequency of the signal emitted by receiver 2. The low pass filter 4 has a sufficiently high upper frequency that overmodulated low frequency signals might be passed. At the same time the cut-off frequency must be sufficiently low such that its output may be used as a decision threshold for a comparator 5. The low pass filter 4 also receives a logic input signal from the interruption detector 3. If this logic input signal changes over to the "freeze" state the low pass filter immediately starts operating as an analogue memory, i.e. the output of the low pass filter will keep the analogue value it had at its output immediately before the "freeze" state was initiated. Note that the expression "analogue memory" by necessity does not imply that the analogue memory consists of analogue components. What is referred to is that an analogue signal value is kept in a memory which in principle may also contain digital components. When the logic state is changed from "freeze" to "non-freeze", the low pass filter again immediately starts operating as an ordinary low pass filter. An embodiment of the low pass filter is depicted in FIG. 3. An analogue switch 16 is closed in the "non-freeze" state and opened in the "freeze" state. The real low pass filter consists of a resistance 14 and a capacitance 15 connected to signal ground 17. When the switch is closed a normal one pole low pass filter is achieved and buffered by a high impedance amplifier 18 having typically unity gain. In the "freeze" state the analogue switch is opened and the analogue value present before the "freeze" state is stored in the capacitor 15. Due to the amplifier having high impedance the analogue value may persist for a long period of time. The analogue switch 16 is preferably an electronic type, e.g., a DMOS transistor.

Figure 4:
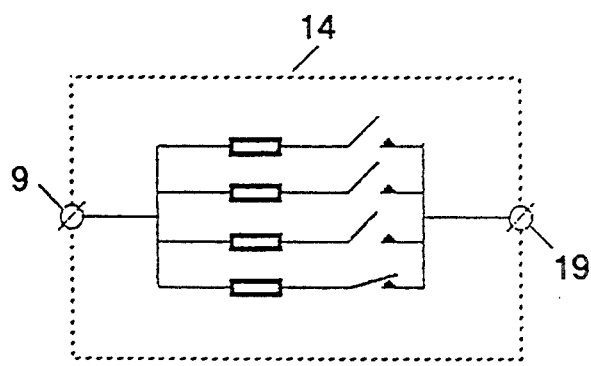
FIG. 4 is an embodiment of resistance 14 of the arrangement of FIG. 3.

An embodiment of a resistance 14 is demonstrated in FIG. 4. The resistance 14 consists of a number of resistors which may be combined by means of analogue switches, which may be mechanical or electronic type. The resulting value of resistance between node 9 and node 19 may be varied within wide limits. Accordingly, the cut-off frequency of the low pass filter may be varied, and this is advantageous if the device according to the present invention has to be interfaced to different types of optical input signals.

The comparator 5 comprises a decision circuitry. The task of such circuitry is to compare its two input signals, decide which input signal is the largest, and control its output signal such that it presents a high or a low output level depending upon which input signal is the largest. During an interruption of the optical input signal, the first upper input signal to the comparator 5 gets the value zero or a value very close to zero, while the second lower input signal, as previously shown, keeps the value present before the interruption. When the signal comes back, the second lower input signal immediately has the correct level due to the low pass filter acting as an analogue memory for the signal before the "freeze" state. When there is a normal input signal having about equal amounts of ones and zeros and no interruptions, the second lower input signal from the low pass filter will be approximately at the middle of the extreme values of the signal from the receiver 2, where one extreme corresponds to optical "one" and the other extreme corresponds to optical "zero". This is what is sought; in order for the device of FIG. 2 to operate well, over a long period of time (within which interruptions are not counted) compared to the time constant of the low pass filter, the numbers of "ones" and "zeros" will be approximately equal.

An AGC circuitry 6 is an amplifier having a very slow (order of Hz) gain control, which slowly controls its gain such that the average value of the output signal is constant. The value of the output signal in turn determines the optical output power from the laser, i.e. the output signal from the AGC circuitry 6 constitutes a set point for the control loop of the laser transmitter. The AGC circuitry is provided since it is desirable that the laser have the same output power level independent of the optical input power level. If different installations are compared, the optical input power level may vary by more than 10 dB dependent upon the fibre attenuation and the number of optical terminals and the like. For a given installation the optical input power level is fairly constant if it is disregarded that the power decreases at interruptions. Due to the analogue memory function of the low pass filter 4, the gain of the AGC circuitry 6 will not be affected during an interruption.

Figure 5:
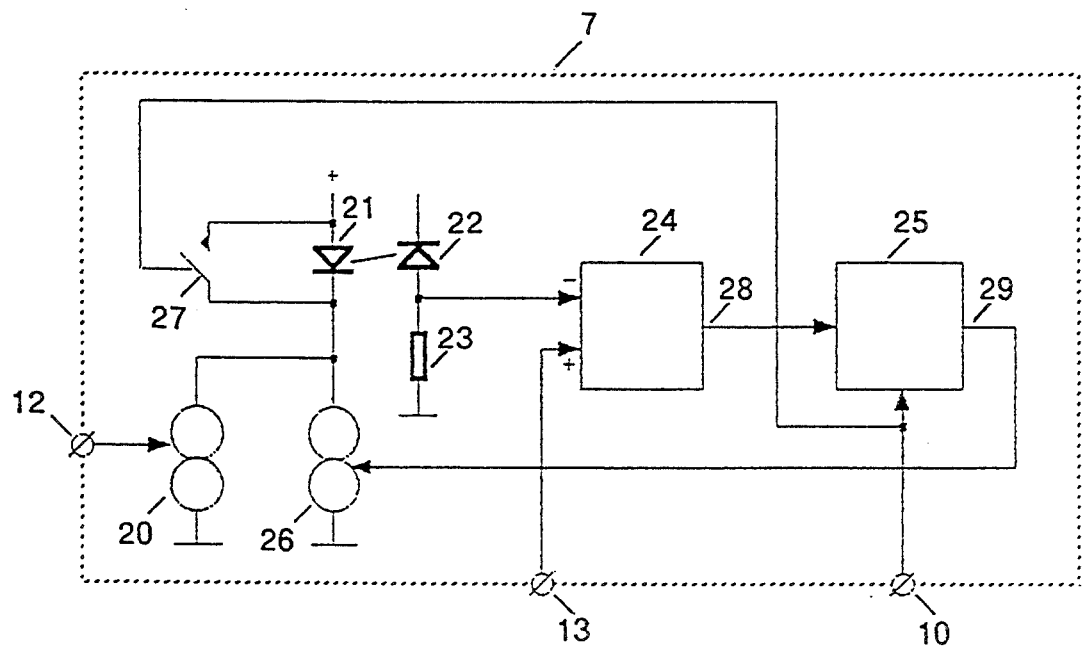
FIG. 5 is an embodiment of a laser transmitter 7 of the arrangement of FIG. 2.
Figure 6:
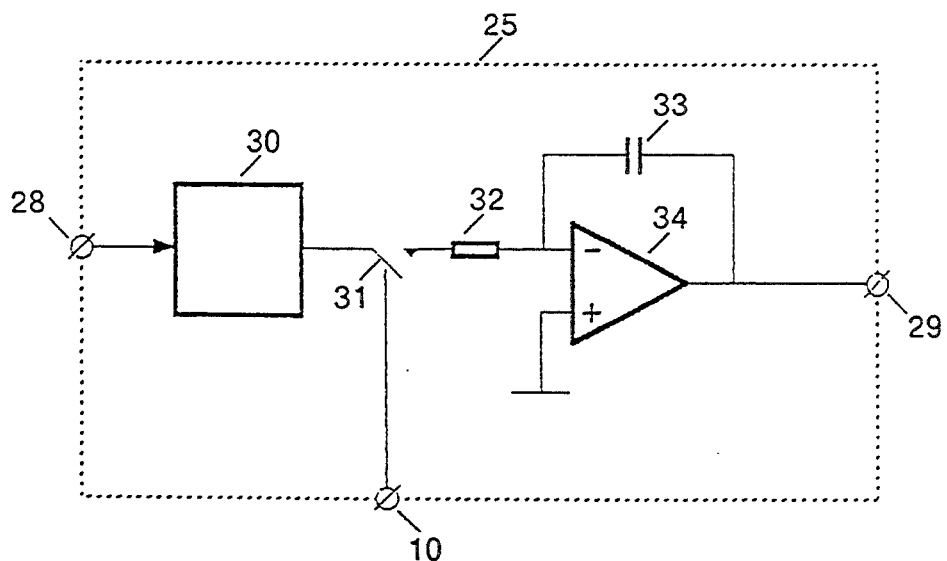
FIG. 6 is an embodiment of an integrator 25 of the arrangement of FIG. 5.

A laser transmitter 7 has three input signals which include the signal from the comparator 5, the signal from the AGC circuitry and the logical signal from the interruption detector 6. The optical output signal from the laser transmitter is coupled to a fibre 8. The signal from the comparator 5 modulates the laser by a high frequency data signal. The signal from the AGC circuitry 6 constitutes the set point for the control loop of the laser transmitter. Like most conventional laser transmitters for fibre optics, the laser transmitter 7 has a control loop for the average power. What in reality is controlled in this and most other laser transmitters is the light power incident on a monitor diode which is a photodiode positioned in proximity of the laser. Since the light being coupled to the fibre 8 is proportional to the light incident of the monitor diode, the optical output signal to the fibre is controlled. Contradictory to most conventional laser transmitters, compared to the data signal, the set point constitutes a slowly varying signal. This signal has been passing the low pass filter 4 and the AGC circuitry 6. It is important that the set value vary in time in order to be able to transfer an overmodulated low frequency signal. So long as the low pass filter 4 has a sufficiently large bandwidth to pass the overmodulated low frequency signal from the receiver 2, the average of the signal at node 13 will have an overmodulated low frequency signal which was initially present in the optical input signal according to the example in FIG. 1. In order for the device according to the present invention to work in the intended way, it is important that the control loop of the laser transmitter have a sufficiently large bandwidth to be able to transfer the overmodulated low frequency signal. As the logic signal at node 10 changes from the "non-freeze" state to the "freeze" state two things happen simultaneously at the laser transmitter. First, the laser current is diverted, e.g., by a switch shorting out the laser diode, such that the optical output power into the fibre goes to the interruption level described previously. Secondly, the control loop of the laser transmitter is simultaneously "frozen" such that the analogue value controlling the average power of the laser is kept in an analogue memory. As noted above, the expression "analogue memory" does not necessarily mean that the analogue memory consists of analogue components. What is referred to is that an analogue signal value may be kept in a memory which in principle may also contain digital components. When the logic signal at node 10 returns to the "non-freeze" state, two things happen simultaneously. First the diversion of the laser current is discontinued. Secondly, the "freezing" of the control loop of the laser is discontinued, i.e. it continues as usual having the analogue value from the analogue memory as a starting point. Due to the analogue memory function, the laser transmitter operates immediately after the interruption. Without the analogue memory value it would take a long time for the control loop of the laser to regulate into its normal value. An embodiment of the laser transmitter is depicted in FIG. 5. Assuming that a large optical signal from fibre 1 is giving a certain logic level at node 12, the signal at node 12 will cause a current generator 20 to supply a current which may be denoted $I_1$. At low optical signal in fibre 1 the level at node 12 shifts, which in turn decreases the current from the current generator 20 to a current $I_0$ which is less than $I_1$. The difference current $I_1 - I_0$ forms the peak-to-peak value of the high frequency modulation current passing a laser diode 21. It is important that the current difference $I_1 - I_0$ be sufficiently large to drive the laser diode from an optical level below or at the laser threshold ("level zero") to the high optical level corresponding to an optical "one" ("level one"). Note that the plus sign above the laser diode 21 symbolizes that the laser is forward biased, i.e., that the anode is positive relative to the cathode. Also note that to simplify the drawing the connection of the fibre 8 to the laser diode is not drawn in FIG. 5. The laser diode has two mirrors emitting light. The light from one mirror is coupled to a monitor diode 22 and the light from the other mirror is coupled to the fibre 8. The light impinging on the monitor diode 22 generates a current which is proportional to the level of light. This current generates a signal proportional to the current by means of a block 23 which may be, for example, a simple resistor. This signal is connected to the negative input terminal of a differential amplifier 24, which receives at its positive input terminal (node 13) the set point of the control loop. At its output the differential amplifier produces the difference signal between the inputs, i.e., the signal at the positive input minus the signal at the negative input. The output signal from the differential amplifier 24 is connected to an integrator 25, which, except for true integration, also gives a certain gain which is denoted A. The bandwidth of the control loop is directly proportional to the gain factor A according to classic control theory. The output signal from the integrator 25 acts on a current generator 26, and when the current increases the optical power into the fibre 8 also increases. It should be noted that which has so far been stated regarding this embodiment of the laser transmitter is known in the art and has only been added as background for the rest of the description of the embodiment of the laser transmitter 7. As node 10 changes to the "freeze" state, the integrator 25 keeps its analogue output signal which it had just before the "freeze" state occurred. Exactly simultaneously a switch 27 shorts out the laser diode 21 such that no, or almost no, current passes the laser diode. The switch 27 is an electronic switch, e.g., in form of a DMOS transistor. When node 10 returns to the "non-freeze" state the integrator 25 stops acting as an analogue memory and carries on simultaneously as the shorting of the laser diode ceases. Due to this method, at the change from the "freeze" state to the "non-freeze" state, the laser diode may at once supply the correct optical output power without having to wait for the slow building-up of the laser control loop. An embodiment of the integrator 25 is depicted in FIG. 6. An amplifier 30 amplifies and inverts the signal from node 28. an operational amplifier 34, a resistor 32 and a capacitor 33 forms a classic inverting integrator. As input 10 changes to the "freeze" state a switch 31 is opened which indicates that the analogue value is stored at the output of the operational amplifier 34, provided that the operational amplifier 34 has high impedance inputs. The switch 31 is an electronically designed analogue switch. In one embodiment of the amplifier 30, the user may, from the outside, vary the gain in order to vary the bandwidth of the control loop. This is advantageous if the device according to the present invention has to be interfaced to different types of optical input signals.

I claim:

1. A device for conversion of an incoherent optical data signal transmitted from a multimode fiber to a corresponding signal which is transmitted to a single mode fiber by a laser transmitter, comprising:

means connected to a multimode fiber for transforming an optical input signal received from said multimode fiber into an electric signal, said transforming means comprising a DC-coupled optical receiver having a receiver input connected to said multimode fiber and a receiver output;

a laser transmitter having a first transmitter input, a second transmitter input, a third transmitter input and a transmitter output, said transmitter output being connected to a single mode fiber and comprising a control loop and a memory device connected thereto;

an AGC circuit having an AGC input, and an AGC output connected to said first transmitter input;

a low pass filter having a first filter input connected to said receiver output, a second filter input, and a filter output connected to said AGC input;

comparator means for receiving said electric signal from said transforming means and for transmitting a signal to said laser transmitter to modulate said laser transmitter, said comparator means comprising a comparator having decision circuitry and a first comparator input connected to said receiver output, a second comparator input connected to said filter output and a comparator output connected to said second transmitter input; and interruption detector means connected to said transforming means, said low pass filter and said laser transmitter (a) for detecting optical interruption of said incoherent optical data signal and in response simultaneously (1) diverting laser current to interrupt optical output power emitted into said single mode fiber and (2) storing an analogue value of said control loop in said memory device, and (b) for detecting when said optical interruption ceases and in response simultaneously (1) discontinuing diverting laser current to thereby resume said optical output power emitted into said single mode fiber and (2) operating said laser transmitter on the basis of analogue values previously stored in said memory device, said interruption detection means comprising a detection input connected to said receiver output and a detection output connected to said second filter input and said third transmitter input.

2. The device according to claim 1 wherein said interruption detector means is a preset interruption detection delay device.

3. The device according to claim 1 wherein said interruption detector means is an adjustable interruption detection delay device.

4. The device according to claim 1 wherein said low pass filter comprises a conventional one pole RC filter having an analogue switch in series with a resistance and a high impedance amplifier buffering the filter.

5. The device according to claim 4 wherein said control loop of said laser transmitter comprises a means for adjusting the bandwidth.

6. The device according to claim 5 wherein said laser transmitter comprises an integrator (25) comprising an amplifier (30), an operational amplifier (34) having a capacitance (33) between a negative input of said operational amplifier and the output of said operational amplifier, and a resistance (32) connected in series with an analogue switch (31) between an output of the amplifier and the negative input of said operational amplifier, the positive input of said operational amplifier being connected to a reference voltage.

7. A method for conversion of an incoherent optical data signal transmitted from a multimode fiber to a corresponding signal which is transmitted to a single mode fiber by a laser transmitter, comprising the steps of:

emitting an optical signal;

transforming said optical signal into an electric signal and coupling said electric signal to a comparator to a low loss filter and to an interruption detector;

filtering said optical signal by means of said low loss filter and transmitting a resulting low loss filter signal to said comparator and an AGC circuit;

modulating a laser transmitter by means of said comparator;

outputting a set point signal for a control loop of said laser transmitter by means of said AGC circuit;

detecting optical interruption of said incoherent optical data signal and in response simultaneously (1) diverting laser current to interrupt optical output power emitted into said single mode fiber and (2) storing an analogue value of said control loop in said memory device, and detecting when said optical interruption ceases and in response simultaneously (1) discontinuing diverting laser current to thereby resume said optical output power emitted into said single mode fiber and (2) operating said laser transmitter on the basis of analogue values previously stored in said memory device.

* * * * *